G. W. MATHISON.
DISPENSING MACHINE.
APPLICATION FILED MAY 31, 1917.
1,241,646.
Patented Oct. 2, 1917.
2 SHEETS—SHEET 1.
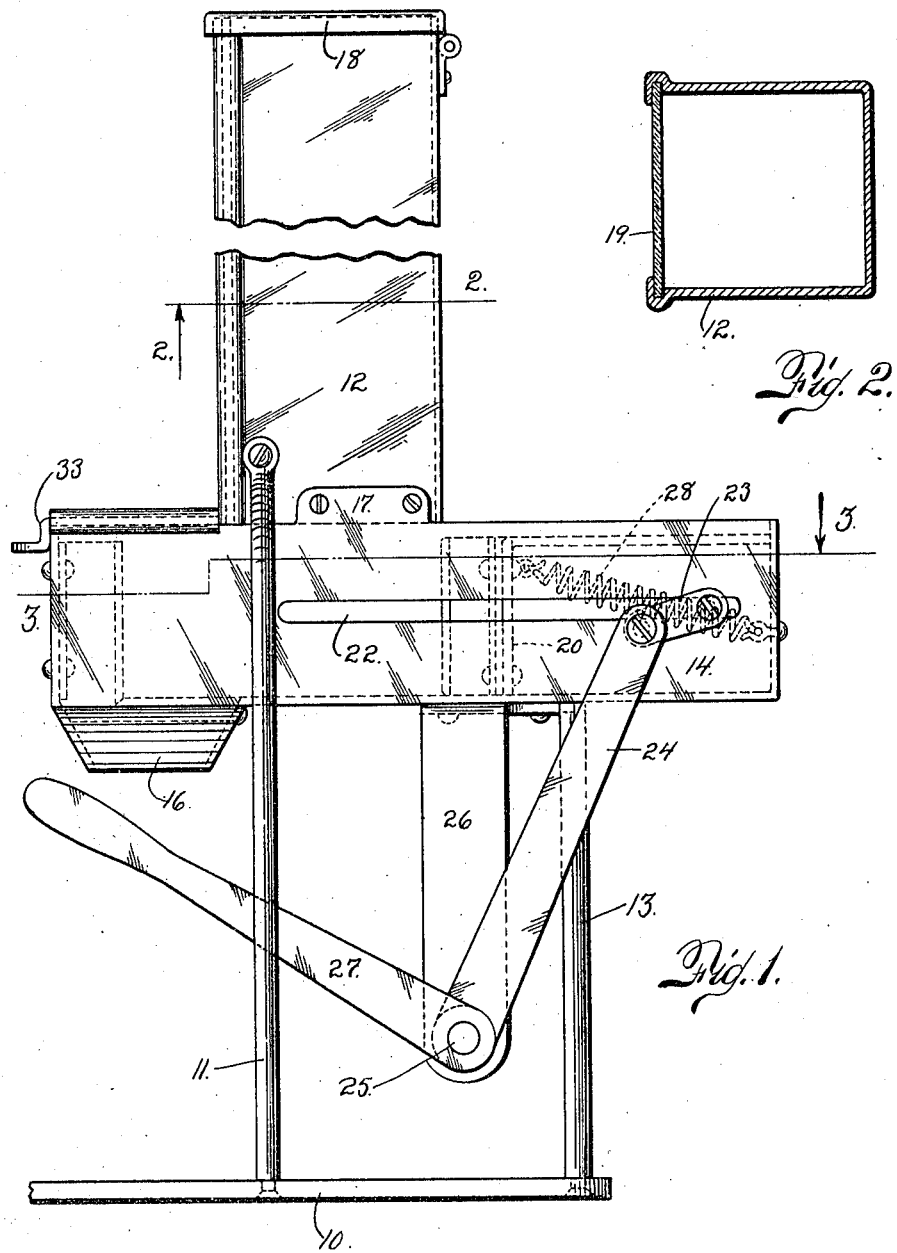
Inventor
G.W. Mathison.
By
W.W. Boughton Attorney

G. W. MATHISON.
DISPENSING MACHINE.
APPLICATION FILED MAY 31, 1917.

1,241,646.

Patented Oct. 2, 1917.
2 SHEETS—SHEET 2.

Inventor
G. W. Mathison.
By
W. W. Boughton
Attorney

UNITED STATES PATENT OFFICE.

GEORGE W. MATHISON, OF DENVER, COLORADO.

DISPENSING-MACHINE.

1,241,646.  Specification of Letters Patent.  Patented Oct. 2, 1917.

Application filed May 31, 1917. Serial No. 171,842.

*To all whom it may concern:*

Be it known that I, GEORGE W. MATHISON, a citizen of the United States, and a resident of the city and county of Denver, State of Colorado, have invented a certain new and useful Improvement in Dispensing-Machines, of which the following is a full, clear, and exact description.

My invention is an improvement in dispensing devices and its object is the provision of a device of the character mentioned which will serve to remove the stored articles one at a time from a receptacle or magazine and, after the article is so removed, to crush or pulverize the same for use. It is particularly adapted for dispensing food packages such as are described in my co-pending application Serial Number 165,535, filed April 30, 1917. That application covers a package of malted milk or like comminuted food incased in a container of friable, edible material, its object being to furnish a cartridge of the food or drink constituent in question of proper size to constitute one service and so labeled with the manufacturer's name or trade-mark as to prevent substitution of other or inferior goods by an unscrupulous dealer. The specific object of the present invention, therefore, is the provision of a dispensing device for articles of the character described which shall contain the food packages (which are preferably cubical in shape) stored within plain view of the customer, and which will deliver a single package to the front of the machine, where it is crushed and pulverized and then discharged into a glass or other receptacle in which the food or drink is to be compounded. More particular and further objects and advantages of my invention will later appear from this specification.

In the two sheets of drawings accompanying this application and forming a part hereof Figure 1 is a side elevation of my entire machine;

Fig. 2 is a horizontal section through the magazine portion of my device, taken on the line 2—2 of Fig. 1;

Figure 3:
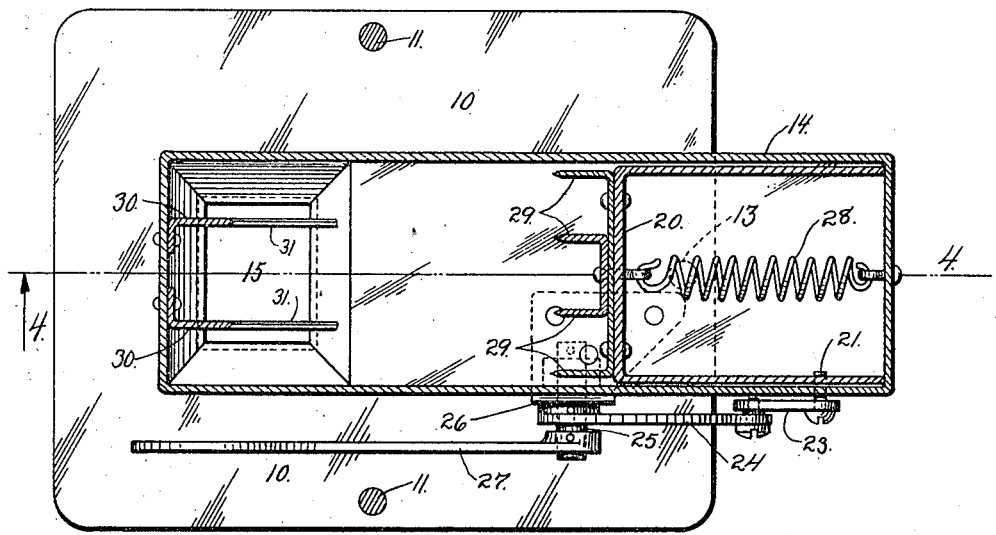
Fig. 3 is a horizontal section through the plunger chamber, taken on the line 3—3 of Fig. 1.
Figure 4:
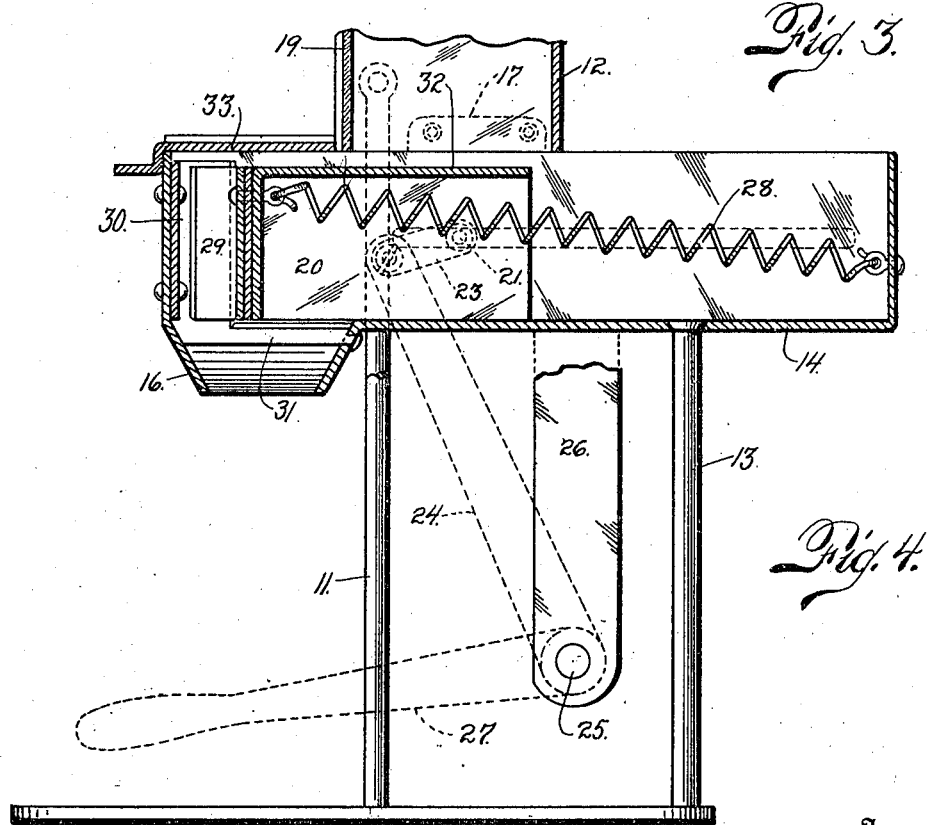
Fig. 4 is a partial vertical section taken on the line 4—4 of Fig. 3.

Referring to the drawings, in which like characters of reference designate like parts on the several views, the reference 10 designates a base adapted to rest on a table, counter or the like, 11 a pair of front standards rising therefrom and preferably screwed or otherwise secured to the magazine portion of my device 12, and 13 is a single rear standard which supports the rear of the plunger chamber 14. This plunger chamber is preferably rectangular in cross section and elevation, with its longer dimension horizontal and disposed from front to rear. The sides, rear and front of the plunger chamber are closed, its top is open save for a removable front closure later to be described, and its bottom is closed save for an opening 15 at the front which opening communicates with a hopper 16.

The magazine 12 is located a little forward of the middle of the plunger chamber and its open bottom communicates therewith. As a convenient means of construction I prefer to support the front of the plunger chamber from the magazine by flanges 17 screwed thereto, though this is merely a structural detail and may be varied without departing from my invention. The magazine 12 is shown as square in horizontal section to conform to the preferred shape of package to be vended, though it will be obvious that this shape may be varied to suit the selected shape of food package to be employed. A closure 18 is preferably provided for the top of the magazine and the magazine has a glass front 19 to render its contents visible to the customer.

Within the plunger chamber 14 there is provided a plunger 20 of the same shape as the chamber and adapted to be reciprocated therein. The plunger 20 carries at one side a pin 21 which projects through a slot 22 formed in the chamber wall and a link 23 connects the pin 21 with a lever 24 pinned to a short shaft 25 journaled in a bracket 26 which depends from the bottom of the plunger chamber. Also pinned to the shaft 25 there is an operating lever 27. A tension spring 28 connected to the plunger and to the rear wall of the plunger chamber tends to return the plunger to the rear end of the plunger chamber 14.

The front face of the plunger 20 carries a series of thin knife blades 29 sharpened on their front edges and adapted to straddle a similar series of blades 30 carried by the inner side of the front of the plunger chamber. There is also a set of knife blades 31 across the bottom of the hopper 16, which in the present instance are shown as formed of right angled continuations of the vertical blades 30 though these blades 31 may be separately formed if desired, the shape shown being merely selected for convenience in mounting.

Operation.

The magazine 12 is filled with the food packages to be dispensed, the lower of these resting on the bottom of the plunger chamber and the remaining being visible through the glass front 19 of the magazine. If, now, the operating lever 27 be depressed it will rock the lever 24 which will, through the link 23, pull the plunger 20 to the front and push the lowest of the food packages into the front end of the plunger chamber, the remainder of the food packages being retained in their original position by the closed top 32 of the plunger 20. The food package, the container of which is, as previously described, of very friable character, will be crushed between the plunger and the front end of the plunger chamber, the knives 29, 30 materially aiding in this action. The knives 31 across the open portion 15 of the bottom of the plunger chamber will prevent any large portions of the container from escaping through the hopper 16 and serve to subdivide any such large particles, as the package and its container are forced between them by the action of the plunger. During this pulverizing action of the plunger exit of the material acted upon upward is prevented by a closure 33, which closes that portion of the top of the plunger chamber which is in front of the magazine, and thus the package container and its contents are forced out through the bottom, the only opening through which they may escape. The closure 33 is preferably removable for convenience in cleaning the machine.

When the lever 27 is released the spring 28 will retract the plunger 20 to the position indicated in Fig. 3, when the lowest of the packages in the magazine will drop to a position in front of the plunger ready to be operated upon when the lever 27 is again depressed.

Having thus described my invention, what I claim and desire to secure by Letters Patent is:—

1. In a dispensing device, a horizontal plunger chamber, a vertical magazine in communication with said plunger chamber and located above the same intermediate the ends thereof, said plunger chamber being closed on the side and front walls and having an opening in the bottom thereof adjacent said front wall and out of line with said magazine, a plunger in said chamber, and means for reciprocating said plunger from a position to the rear of said magazine to a position closely adjacent the front wall of said plunger chamber.

2. In a dispensing device, a horizontal plunger chamber, a vertical magazine in communication with said plunger chamber and located above the same intermediate the ends thereof, said plunger chamber being closed on the top, side and front walls and having an opening in the bottom thereof adjacent said front wall and out of line with said magazine, a plunger in said chamber, and means for reciprocating said plunger from a position to the rear of said magazine to a position closely adjacent the front wall of said plunger chamber.

3. In a dispensing device, a horizontal plunger chamber, a vertical magazine in communication with said plunger chamber and located above the same intermediate the ends thereof, said plunger chamber being closed on the top, side and front walls and having an opening in the bottom thereof adjacent said front wall and out of line with said magazine, a plunger in said chamber, said plunger being closed on the top and substantially filling said chamber, and means for reciprocating said plunger from a position to the rear of said magazine to a position closely adjacent the front wall of said plunger chamber.

4. In a dispensing device, a vertical magazine, a horizontal plunger chamber communicating with the bottom of said magazine, said plunger chamber being closed on the top, side and front walls and having an opening in the bottom thereof adjacent said front walls, a plunger in said chamber, and means for reciprocating said plunger from a position to the rear of said magazine to a position closely adjacent the front wall of said plunger chamber.

5. In a dispensing device, a vertical magazine, a horizontal plunger chamber communicating with the bottom of said magazine, said plunger chamber being closed on the top side and front walls and having an opening in the bottom thereof adjacent said front wall, said opening being barred to the passage of particles of considerable size but free to permit escape of fine particles, a plunger in said chamber, and means for reciprocating said plunger from a position to the rear of said magazine to a position closely adjacent the front wall of said plunger chamber.

6. In a dispensing device, a vertical magazine, a horizontal plunger chamber communicating with the bottom of said magazine, said plunger chamber being closed on the side and front walls and having an opening in the bottom thereof adjacent said front wall, a plurality of thin, knife-edged blades disposed across said opening below the plane of the bottom of said chamber, a plunger in said chamber, and means for reciprocating said plunger.

7. In a dispensing device, a vertical magazine, a horizontal plunger chamber communicating with the bottom of said magazine, said plunger chamber being closed on the top, side and front walls and having an opening in the bottom thereof adjacent said front wall, a plurality of cutting elements disposed across said opening below the plane of the bottom of said chamber, a plunger in said chamber, cutting elements carried by the face of said plunger, cutting elements carried by the inner face of the front wall of said chamber, and means for reciprocating said plunger.

In testimony whereof, I have hereunto affixed my signature.

GEORGE W. MATHISON.